3,063,853
PAVING AND SURFACING COMPOSITION
Glenn Sucetti, P.O. Box 1960, Grass Valley, Calif.
No Drawing. Filed Sept. 25, 1958, Ser. No. 763,199
2 Claims. (Cl. 106—191)

This invention relates to paving and surfacing compositions.

This application is a continuation-in-part of my copending application Serial No. 601,114, entitled "Construction and Coating Materials," filed July 31, 1956, now U.S. Patent No. 2,861,004.

In my copending application referred to above, there is described and claimed a mixture of mineral aggregate and bituminous emulsion which is adapted for use as a paving surface and overlayment material. The said mixture is advantageous for a number of reasons, among which may be mentioned its excellent storage qualities and the fact that, when it is mixed with water and Portland cement, it sets to a concrete-like product which bonds well to a subsurface of a structural concrete and the like, even when applied in very thin layers.

The present invention is directed to improvements upon the composition of my copending application. More particularly the present invention is directed to a modification of the composition of said copending application which dispenses with the requirement of adding an hydraulic cement such as Portland cement. One object of such modification is to supply small users, such as householders doing repair jobs on highways and sidewalks, with a mixture which is complete and does not require the addition of cement. A similar object is to provide larger users, such as industrial users, paving contractors and the street and highway departments of municipalities and other political subdivisions, with a complete mix which can be used on small repair and patching jobs and which does not require the addition of Portland cement.

It will be understood that, in a small repair job, it is inconvenient to employ Portland cement because of its poor keeping qualities. Once a bag of Portland cement has been opened and partly used, the remainder is apt to deteriorate. Also there is a considerable labor and nuisance involved in mixing Portland cement with aggregate on the job.

It is, therefore, a principal object of the present invention to provide a complete plastic mix which does not require the addition of a binder such as Portland cement, which has good storage qualities, which can be applied to concrete and other surfaces for repair work and the like and which, even so applied, will set by drying and/or chemical action to form a hard, adherent, durable surface layer. The plastic mixtures of my invention also require no primer coat.

I have discovered that a plastic mix of the character described (i.e., a mix containing all the ingredients necessary for final use) can be provided by mixing a mineral aggregate; a stable mixing type, oil-in-water type bituminous emulsion; and an organic binder and film forming agent. It may be necessary or desirable to add a small quantity of water to thin the mixture suitably for use; and if desired the mixture may be prepared as a thick paste to be packaged in polyethylene lined paper bags, in which case a greater quantity of water will be added at the time of use. However, in general, only a very small quantity of water, if any, need be added, sufficient to thin the mixture sufficiently for easy application.

The aggregate may be any mineral aggregate ranging in density of about 8 pounds per cubic foot in the case of expanded vermiculite or perlite to 100 pounds per cubic foot in the case of sand or small gravel. However I prefer to use a mixture of lighter weight and denser aggregates, such as a mixture of volcanic ash, Haydite or slag (which weigh about 55 to 65 pounds per cubic foot) and ordinary sand (which weighs about 100 pounds per cubic foot). These two types of aggregate are preferably employed in the proportions of about 1 to 4 cubic feet of the lighter aggregate per cubic foot of the denser aggregate.

The emulsion, as stated, is a stable, mixing type, oil-in-water type bituminous emulsion, preferably an asphalt emulsion containing about 45–55% by weight of asphalt and stabilized to pass ASTM D977–57 Test. In functions to waterproof the end product and to impart toughness and good wearing properties. Preferably the emulsion stabilizer is saponified Vinsol Resin and is present in the amount of about 2½% of the weight of emulsion. Vinsol Resin is the trademark of a product which has been known since prior to 1940 as an extract of pinewood resin. In the form used in my present invention it is preferably neutralized with caustic alkali, preferably caustic soda and it is produced as follows:

Pinewood is extracted with hydrocarbon solvent such as benzene to form a preliminary extract consisting, after evaporation of the solvent, of a mixture of turpentine, pine oil, rosin, and the resin appropriate for use in practicing the present invention. The turpentine and the pine oil are removed from the mixture by distillation following which the remaining mixture is extracted with a preferential solvent, for example, a petroleum hydrocarbon such as petroleum ether or gasoline, which removes the rosin, leaving a dark colored resinous substance which, when freed from the excess solvent, forms the resin contemplated by the present invention. The method of producing this resin is fully described in the specification of U.S. Letters Patent No. 2,193,026, granted March 12, 1940. This resin is further characterized by a methoxy content of from 3% to 6%, a melting point by the drop method within the limits of about 115° C. to 125° C. and an acid number of about 100. The resin can be saponified by treatment with a solution of potassium hydroxide, for example, to produce a saponified resin solution in the manner more particularly described in the specification of U.S. Letters Patent No. 2,199,306, granted April 30, 1940.

The organic binder and film forming agent is preferably a carboxymethyl cellulose, for example, sodium carboxymethyl cellulose containing about 0.65 to 0.85 sodium carboxymethyl groups ($CH_2COONa$) per anhydroglucose unit. This material functions as a film forming agent and binder. A suitable commercial product is CMC 70 High. One of the properties of this material is that it swells when mixed with water. By selecting a finer grind of sodium carboxymethyl cellulose, the time required can be diminished very substantially. In general, water-soluble, film forming cellulose derivatives may be used, for example, water-soluble methyl cellulose but sodium carboxymethyl cellulose is preferred.

The organic binder is preferably used in conjunction with a reactant material which will insolubilize it and form a water-insoluble film. The preferred insolubilizing agent is basic aluminum acetate. Other polyvalent metal salts and also reactive resins such as urea, formaldehyde resins may be used in place of basic aluminum acetate. The resinous materials mentioned react with the carboxymethyl cellulose apparently by cross-polymerization. The aluminum acetate and other polyvalent metal salts act by replacement of the sodium ion of sodium carboxymethyl cellulose. In either case the effect is one of insolubilization and the formation of a water-insoluble film.

There is also preferably included with the organic binder, a substantial quantity of asbestos fibers. The preferred asbestos is a product mined in Napa County, California, which has the following approximate sieve analysis:

| | Percent |
|---|---|
| +20 | 5 |
| +40 | 15 |
| +80 | 20 |
| +100 | 2 |
| +200 | 20 |
| −200 | 38 |

This asbestos is further characterized as follows:

As mined it is crushed to −¾″, dried and screened to reject +½″ material. The drying is such that it does not drive off water of crystallization. The −½″ portion is subjected to hammermilling and the milled material is subjected to air separation. The light fraction is employed in the present invention and it consists partly of granules and partly of fiber. However, other forms of asbestos in fine fiberized form may also be used.

A preferred binder formula for use in accordance with the present invention is as follows:

*Formula A*

| | |
|---|---|
| Asbestos fines lbs | 10 |
| Sodium carboxymethyl cellulose (CMC 70 High) ounces | 15 |
| Basic aluminum acetate do | 1 |

The following example will serve further to illustrate the practice and advantages of the invention:

*Example 1.*—6 pounds of red oxide pigment are ground into 5 cubic feet (325 pounds) of minus 8 mesh volcanic ash. 50 pounds of water are added. 90 pounds of water are placed in a container and 25 lbs. of the above Formula A are added, also 84 lbs. of mixing type asphalt emulsion (about 50–55% asphalt emulsified in water with about 2½ saponified Vinsol Resin), and the mixture is stirred all the while. The mixture of water, Formula A and emulsion are then added to the above mixture of pigment, aggregate and water, mixing is continued and 100 lbs. of sand are added during mixing.

The resulting product is sufficiently plastic to be extruded into containers, e.g., metal containers. When used, the plastic mixture is mixed with a little water so that it will trowel easily. It dries and sets by chemical action of the carboxymethyl cellulose and aluminum acetate. It bonds excellently to asphalt, concrete and other surfaces; it does not require the addition of Portland cement or any other binder; it is excellently adapted to repair usage, e.g., to repair cracks, broken areas, etc. in concrete and asphalt paving and flooring; and it does not require a primer coat on the structure which is being repaired.

Where a surface of this product is subjected to excessive wear it is advantageous to apply a protective coat to the surface. A suitable protective coating material can be prepared as follows:

*Example 2.*—10 pounds of Formula A are stirred into 50 lbs. of water for ten minutes, then 40 pounds of the same asphalt emulsion described in Example 1 are added followed by pigment. Stirring is meanwhile continued. Then a commercial preparation is added to the above in the amount of 50 gallons; stirring is continued and water is added as necessary to provide the desired consistency. The commercial preparation mentioned is a mixture of asphalt emulsion (45–55% asphalt, oil-in-water type, stabilized to pass ASTM D977–57), mineral fibers such as asbestos, a mineral filler material such as fine sand, a pigment and dried blood.

The formula of Example 1 is as follows:

| | |
|---|---|
| Lightweight aggregate (e.g., volcanic ash, Haydite or slag), 5 cu. ft. lbs | 325 |
| Dense aggregate (e.g., sand) lbs | 100 |
| Emulsion (e.g., 45–55% asphalt, stabilized by Vinsol Resin) lbs | 84 |
| Formula A (25#): | |
| Asbestos lbs | 22.7 |
| Na carboxymethyl cellulose oz | 34.1 |
| Basic aluminum acetate oz | 2.3 |
| Total lbs | 534 |

Converted to the basis of 100 pounds of total aggregate the formulation of the compositions of my invention may vary as follows:

| | |
|---|---|
| Total aggregate (lightweight and heavy) lbs | 100 |
| Emulsion (45–55% asphalt or equivalent) lbs | 10 to 40 |
| Formula A (3 to 15 pounds): | |
| Asbestos lbs | 3 to 12 |
| Na carboxymethyl cellulose ounces | 4 to 16 |
| Basic Al acetate do | 0.3 to 1.2 |

In this formulation the aggregate may consist entirely of dense aggregate or entirely of light aggregate but is preferably a mixture as noted above. The emulsion may be any mixing type, oil-in-water type bituminous emulsion but it is preferably an asphalt emulsion stabilized by saponified Vinsol Resin. Formula A need not be used. Thus a mixture of carboxymethyl cellulose (or other binder as explained above) and basic aluminum acetate (or other setting agent) may be used. However, the presence of asbestos is advantageous.

It will, therefore, be apparent that novel and very useful compositions have been provided which are excellently adapted for use in repair work and the like.

I claim:

1. A composition consisting essentially of a wet plastic mixture of, (1) 100 parts by weight of a mixture of substantial proportions each of a dense aggregate weighing not less than about 100 pounds per cubic foot and a lighter aggregate weighing about 55 to 65 pounds per cubic foot; (2) about 10 to 40 parts by weight of a stable, mixing type bituminous emulsion containing about 45–55% of bitumen; (3) about 2 to 12 parts by weight of asbestos fibers and fines; (4) about 4 to 16 ounces (per 100 pounds of said dense aggregate) of sodium carboxymethyl cellulose, and (5) about 0.3 to 1.2 ounces (per 100 pounds of said dense aggregate) of basic aluminum acetate.

2. The composition of claim 1 wherein the emulsion is an asphalt emulsion stabilized by the sodium salt of Vinsol Resin.

References Cited in the file of this patent

UNITED STATES PATENTS

| | | |
|---|---|---|
| 2,374,766 | Mayfield | May 1, 1945 |
| 2,398,047 | Schmidt | Apr. 9, 1946 |
| 2,520,805 | Joy | Aug. 29, 1950 |
| 2,603,573 | Blott et al. | July 15, 1952 |
| 2,733,159 | Scoggin et al. | Jan. 31, 1956 |
| 2,750,297 | Doherty | June 12, 1956 |
| 2,941,893 | McConnaughay | June 21, 1960 |